(12) United States Patent  (10) Patent No.: US 8,210,907 B2
Walter et al.  (45) Date of Patent: Jul. 3, 2012

(54) DEVICE FOR FINE MACHINING WORKPIECES

(75) Inventors: Alfred Walter, Nütingen (DE); Oliver Bey, Esslingen (DE)

(73) Assignee: Gehring Technologies GmbH, Ostfildern (DE)

( * ) Notice: Subject to any disclaimer, the term of this patent is extended or adjusted under 35 U.S.C. 154(b) by 300 days.

(21) Appl. No.: 12/678,557

(22) PCT Filed: Sep. 16, 2008

(86) PCT No.: PCT/EP2008/007696

§ 371 (c)(1),
(2), (4) Date: Mar. 17, 2010

(87) PCT Pub. No.: WO2009/036944

PCT Pub. Date: Mar. 26, 2009

(65) Prior Publication Data

US 2010/0210190 A1  Aug. 19, 2010

(30) Foreign Application Priority Data

Sep. 17, 2007 (DE) .......................... 10 2007 045 619

(51) Int. Cl.
*B24B 33/02* (2006.01)
(52) U.S. Cl. .................. 451/61; 451/57; 451/11; 451/65
(58) Field of Classification Search .................... 451/57, 451/9–11, 180, 184, 61, 65, 163, 119
See application file for complete search history.

(56) References Cited

U.S. PATENT DOCUMENTS

| 4,423,567 A | * | 1/1984 | Raven, III ...................... 451/124 |
| 4,907,372 A | * | 3/1990 | Molitor et al. ................ 451/130 |
| 6,920,678 B2 | * | 7/2005 | Ooe et al. ......................... 29/563 |
| 7,371,149 B2 | * | 5/2008 | Cloutier et al. ................... 451/5 |
| 2006/0089087 A1 | | 4/2006 | Koch | |

FOREIGN PATENT DOCUMENTS

| DE | 295 00 756 U1 | 5/1996 |
| DE | 198 46 278 A1 | 4/2000 |
| DE | 199 29 695 A1 | 3/2001 |
| DE | 10 2004 053 503 A1 | 5/2006 |

* cited by examiner

*Primary Examiner* — Dung Van Nguyen
(74) *Attorney, Agent, or Firm* — Gudrun E. Huckett (57) ABSTRACT

The invention relates to a device for fine machining workpieces, preferably for honing and/or fineboring cylinder bores in crankcases of internal combustion engines, wherein inside a module (1) one or two horizontally displaceable machining units (10, 11, 12, 13) each are provided on two longitudinal sides (2, 3) that are opposite each other for honing and/or fineboring. Each machining unit (10, 11, 12, 13) comprises a spindle (100), a drive for creating the oscillating stroke movement of the spindle (100) and for displacing the machining unit into the working position, a tool holder (8) with a rigid axis, and a feed device (60, 61, 62, 63, 64) for the radial feeding of the machining tools, and between the longitudinal sides equipped with the machining units (10, 11, 12, 13) a service chamber (7) that can be accessed from an end side, wherein at least one tool magazine (30, 31) is associated with the machining units (10, 11, 12, 13) at the rear end side (4) of the module (1).

5 Claims, 11 Drawing Sheets

DEVICE FOR FINE MACHINING WORKPIECES

BACKGROUND OF THE INVENTION

The invention concerns a device for fine machining workpieces, preferably for honing and/or fine boring cylinder bores in crankcases of internal combustion engines.

Today, there are various honing methods, for example, peak honing, friction honing, glide honing, free-form honing, position honing, brush honing, liquid honing, laser structuring etc. All methods differ with respect to the tools, the rotary speeds, the oscillation speeds and possibly the configuration of the tools and their feed action. For each honing method there are various honing machines. For example, for position honing a rotary speed of the honing tool of up to 2,000 $min^{-1}$ is required and simultaneously a stiff spindle support. For finish/plateau honing, on the other hand, a rotary speed of approximately 300 $min^{-1}$ and an articulated tool receptacle are required. When as a result of material changes or a workpiece change the honing method must be changed, the machine must be converted or another honing machine must be used.

It is known to provide a plurality of different working stations wherein each working station is configured for performing at least one working step and at least part is designed as a honing station for performing a honing operation (DE 10 2004 053 503 A1).

The invention has the object to provide an autarkic machining unit with which it is possible to perform as many different machining methods as possible, at least however different honing methods of the aforementioned kind and also fine boring (also referred to as fine turning) without requiring conversion. The unit should be utilizable in particular for cylinder bores in the crankcases for internal combustion engines.

SUMMARY OF THE INVENTION

The object is solved according to the invention in that within a module with substantially rectangular footprint on two oppositely positioned longitudinal sides one or two horizontally movable machining units for honing and/or fine boring are provided, respectively, wherein each machining unit comprises an electromotorically driven spindle, an electromotoric or hydraulic drive that serves for generating the oscillating stroke movement of the spindle as well as for moving the machining unit into a working position, a tool receptacle with a rigid axis relative to the axis of the spindle and a feed device for radial feeding of the machining tools, and in that between the longitudinal sides provided with the machining units a service chamber is provided, that has an entry at one of the end wall connecting the longitudinal sides, and the machining units arranged at a longitudinal side of the module having at least one tool magazine correlated therewith that is arranged at the rear end wall of the module and in that within the module on or in the vicinity of each longitudinal side a machining station is provided, to which workpieces, through the gates arranged at the longitudinal sides, can be supplied, wherein both gates are aligned with one another, and each machining station is accessible for machining by the machining units arranged at the correlated longitudinal side.

When furnishing up to four machining units that are configured for honing and/or fine boring, the important methods for fine machining bores may be integrated into one module, either such that up to four machining steps can be performed sequentially on one workpiece or also such that two or more bores can be machined at the same time. In the first mentioned case, machining time is saved in that on a first machining station a first machining step (for example, pre-honing or fine boring) is carried out by the first machining unit, while the second machining unit may already pick up the required tool from a tool magazine for a second machining step (for example, finish honing). This is possible because of a compact correlation of two machining units—on or in the vicinity of a longitudinal side—with one of two machining stations or machining platform and with one of two tool magazines. The arrangement is such that the machining units arranged along one longitudinal side can access the machining station that is correlated with this longitudinal side as well as the tool magazine that is correlated with this longitudinal side.

The machining unit comprises the following components:
a) a spindle driven in rotation electromotorically;
b) a common drive for the oscillation of the spindle during machining and movement of the spindle into the working position about which the oscillation is carried out,
c) a tool receptacle with an axis that is rigidly secured on the spindle and, during machining, a consistent bearing-out of the spindle (deflection out of the vertical by bending moments acting thereon);
d) a feeding device for radial feeding of the machining tools (for example, honing stones, fine boring cutters).

This machining unit is suitable for performing all honing methods. For example, with four machining units, furnished with different tools, in one molecule it is possible to carry out on the same workpiece sequentially or on two workpieces simultaneously, for example, pre-honing (or fine boring), finish boring (for example, also position honing), laser structuring of the surface, and then, optionally, beveling.

Accordingly, a complete, autarkic, flexible, modular machining cell is proposed that, on the one hand, can completely machine even workpieces that require several working steps but that also can be integrated into another production line within a very short mounting and/or converting time. The external dimensions are selected such that without demounting of components a transport on a roadway (width: 2.2 m, height: 3.55 m), by sea (container) and air (planks) is possible.

The complete module employs as a drive of the spindle for the oscillation and the movement into a working position advantageously directly driven electric linear motors. They are developed further in an advantageous way such that the linear motor is configured in a U-construction (double-sided linear motor). In this way, it is free of any transverse forces during operation.

The tool receptacle is provided with rigid support such that the spindle support is positioned at the smallest possible spacing relative to the beginning of the bore. Preferably, a short and rigidly clamped honing tool is used and the spindle support is connected to the stroke oscillation. In this way, the machining unit can be used also for so-called position honing (DE 103 48 419 B3). The variety of applications is ensured moreover by use of a feed mechanism that may be integrated into the machining unit for honing and fine boring; this is disclosed in the prior patent application DE 10 2007 038 123.0 dated Aug. 4, 2007. This feed device expands the honing tool in the conventional way and serves for preadjustment and post-adjustment of a fine boring tool.

BRIEF DESCRIPTION OF THE DRAWINGS

Embodiments of the invention will be explained in more detail in the following with reference to the attached drawings. It is shown in.

DESCRIPTION OF PREFERRED EMBODIMENTS

Figure 1:
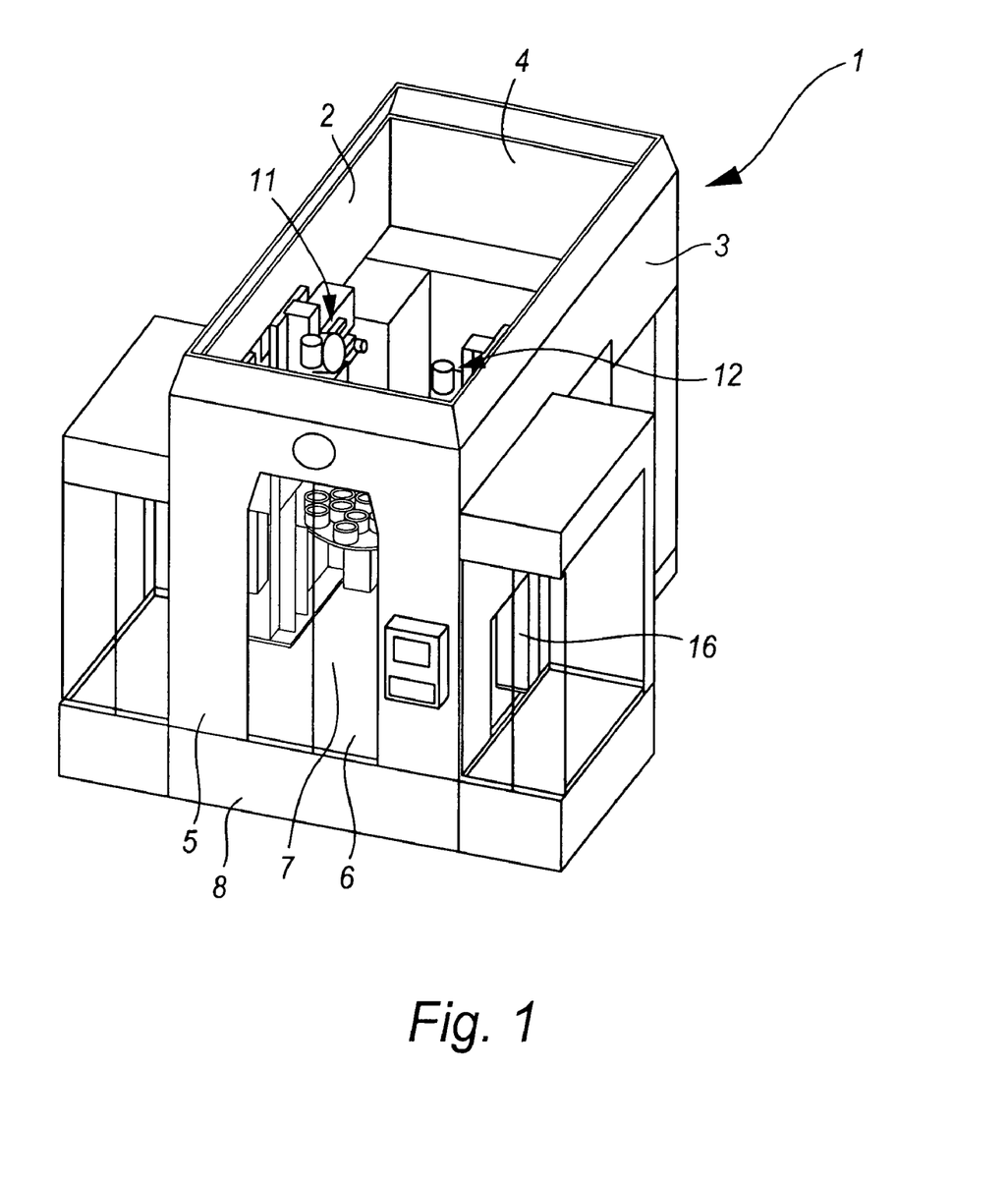
FIG. 1 a schematic view of the module with four machining units.
Figure 3:
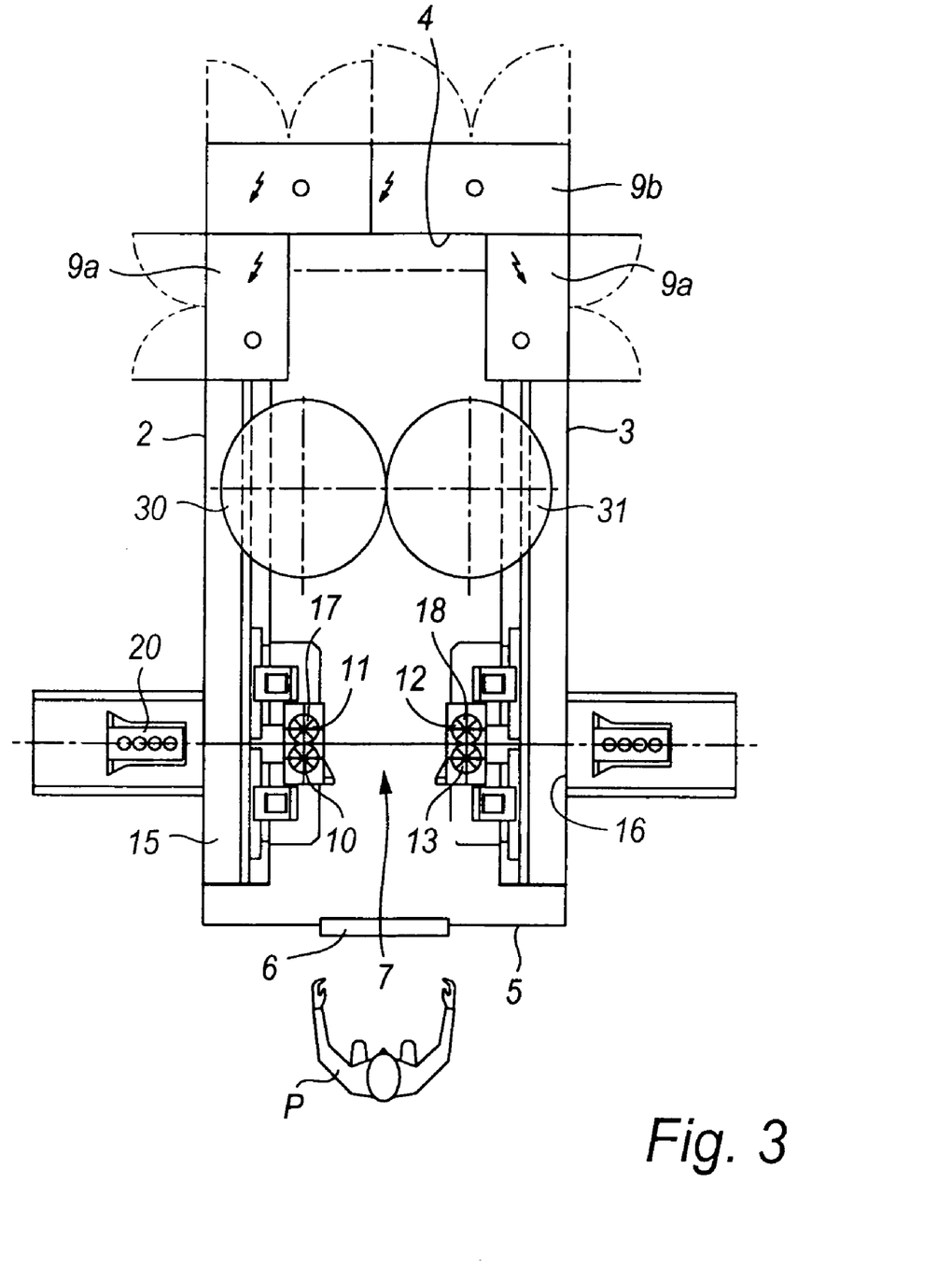
FIG. 3 a schematic plan view onto the module according to FIGS. 1 and 2.

FIG. 1 shows the module referenced in general by 1, embodied as a booth with walls along the two longitudinal sides 2 and 3, a rear end wall 4 and a front end wall 5 as well as an entry 6 to the central service chamber 7. Through this entry 6 the service chamber 7 is accessible by an operator P (compare FIG. 3).

Figure 2:
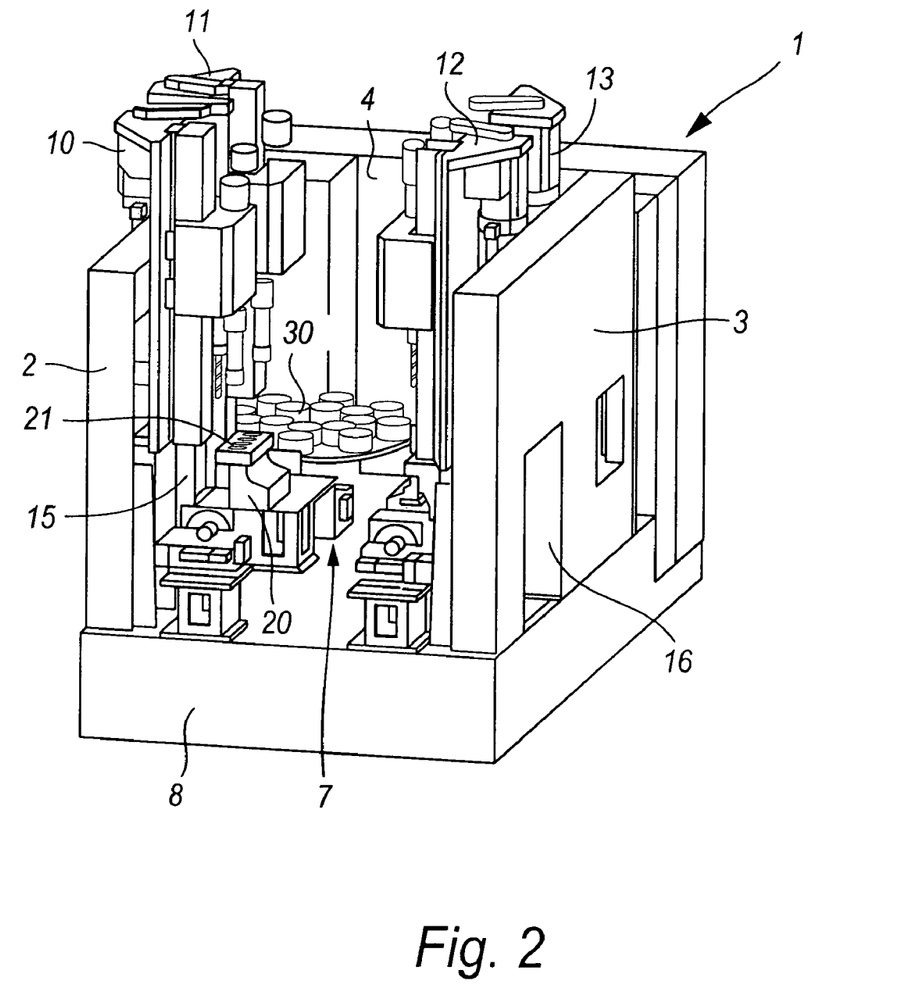
FIG. 2 the module according to FIG. 1 but without the lateral covers so that the inner installations are partially visible.

As can be seen in FIG. 2, along the two longitudinal sides two machining units 10, 11, 12, and 13 are provided, respectively, on the longitudinal side 2 the machining units 10 and 11 and on the longitudinal side 3 the machining units 12 and 13, for example. The correlated control units are housed In the control cabinet 9a on the end sections of the longitudinal sides and 9b at the end wall 4.

By means of gates 15, 16 that are aligned with one another workpieces 20—in the embodiment the crankcase of an internal combustion engine—are transportable into the machining stations 17, 18, respectively, where they are accessible by the machining units 10, 11 arranged at the correlated longitudinal side (at longitudinal side 2) or 12, 13 (at longitudinal side 3) so that they can perform the machining steps on the workpieces 20 positioned thereat.

In the area of the rear end sections of the longitudinal sides 2, 3 near the end wall 4 there are two tool magazines 30, 31. They are arranged such that tools can be picked up from the tool magazine 30 by the machining units 10, 11 and from the tool magazine 31 by the machining units 12, 13. For example, the tools can be honing tools of various kinds or fine boring tools.

Figure 4:
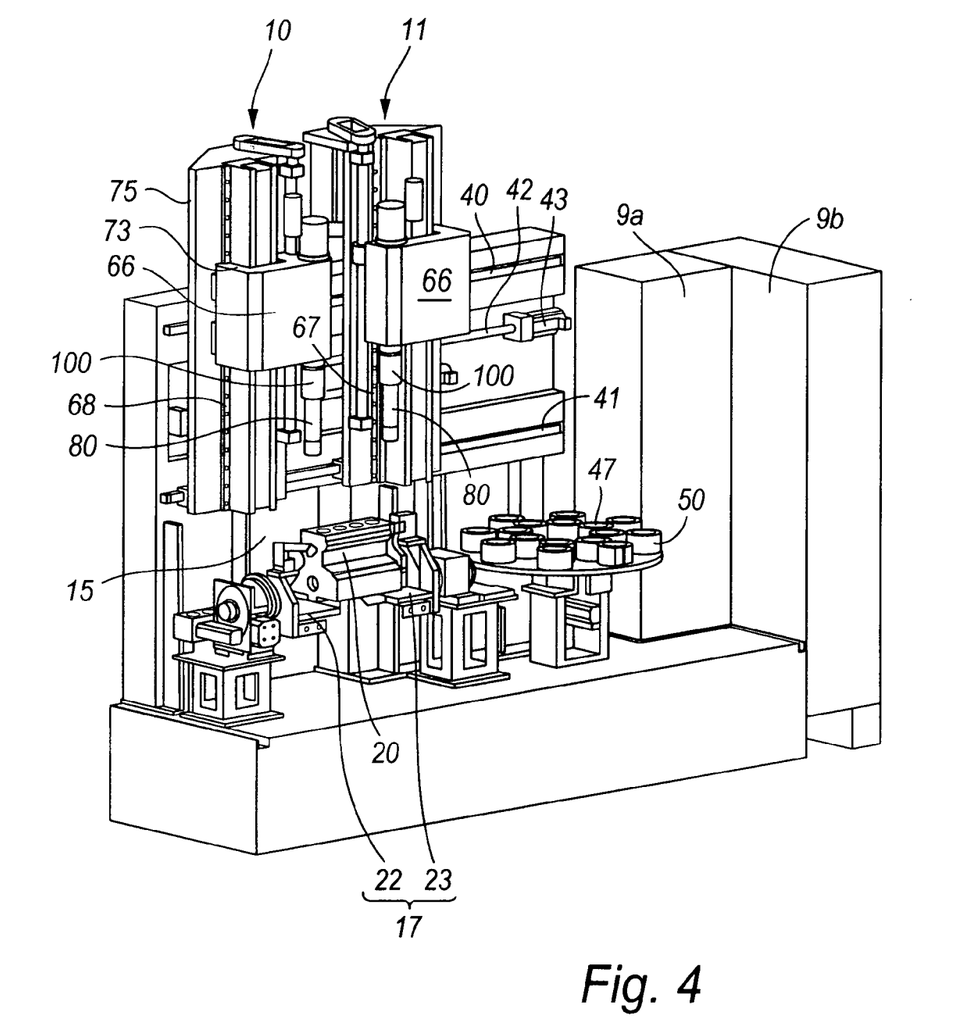
FIG. 4 the left half of the module according to FIGS. 1-3 in perspective view.

FIG. 4 shows in a perspective view one half (relative to FIGS. 1-3: the left half) of a module 1 with the machining units 10, 11; in particular rails 40, 41 are shown on which the machining units 10, 11 are horizontally movable. A workpiece 20 is secured on a pivotable working platform, formed by two pivotable supports 22, 23. The pivoting action is utilized when the rows of bores of a V-type engine that are positioned at an angle to one another must be machined.

Figure 4A:
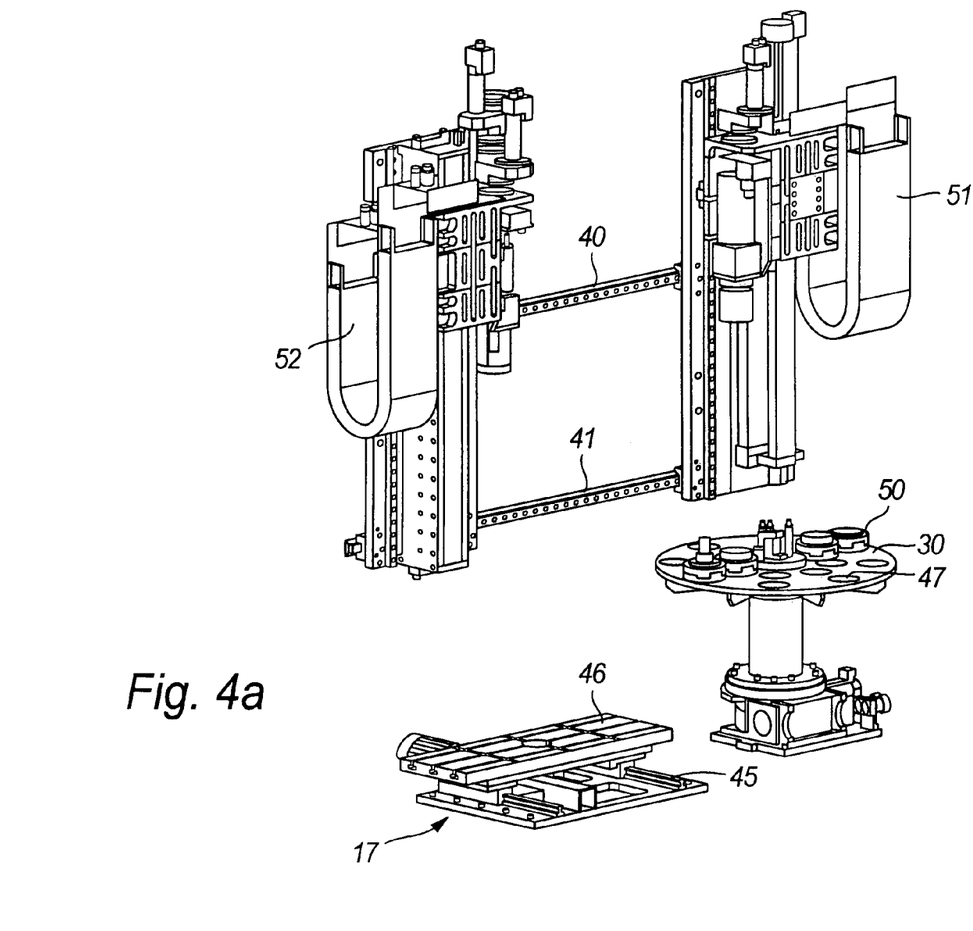
FIG. 4a a variant of FIG. 4 relative to the configuration of one half of a module (schematic, without sidewall)

FIG. 4a shows rails 45 on which a carriage 46 that forms the working platform can be moved into a position (working position) in which the two machining units access a workpiece 20 clamped thereon, i.e., they can work on it. It is also shown that the tool magazine 30 is embodied as a turntable which has receiving openings 47 for tool deposit 50. The receiving openings in the embodiment are arranged on two concentric circles. Preferably, the tools that are received from the left machining unit 10 (in FIG. 4) are arranged in the tool deposit 50 in the outer circle of openings 47 on the turntable while the tools for the right machining unit are arranged on the inner circle of the receiving openings 47. In this way, the travel distances that must be performed by the machining units 10, 11 to reach the tool magazine 30 can be kept minimal. However, it is also possible to provide only one tool magazine and to arrange it at the center in front of the rear end wall wherein it is so large that each tool can be accessed by the machining units on both sides.

The turntable that forms the tool magazine 30 is rotatable about a vertical axis so that with a matched control the tool that is to be accessed, respectively, is moved into the suitable position from which it can be picked up by a machining unit. The supply of signals of the control unit housed in the control cabinets 9a, 9b to the motors arranged in the machining units is realized through lines in trailing cables 51, 52 (see FIG. 4a).

The machining units 10, 11, 12 and 13 can receive feed rods for honing tools as well as feed rods for fine boring tools. Such tools are disclosed in patent application 10 2007 038 123.0 dated Aug. 4, 2007, the contents of which is incorporated by reference into the instant application.

Figure 6:
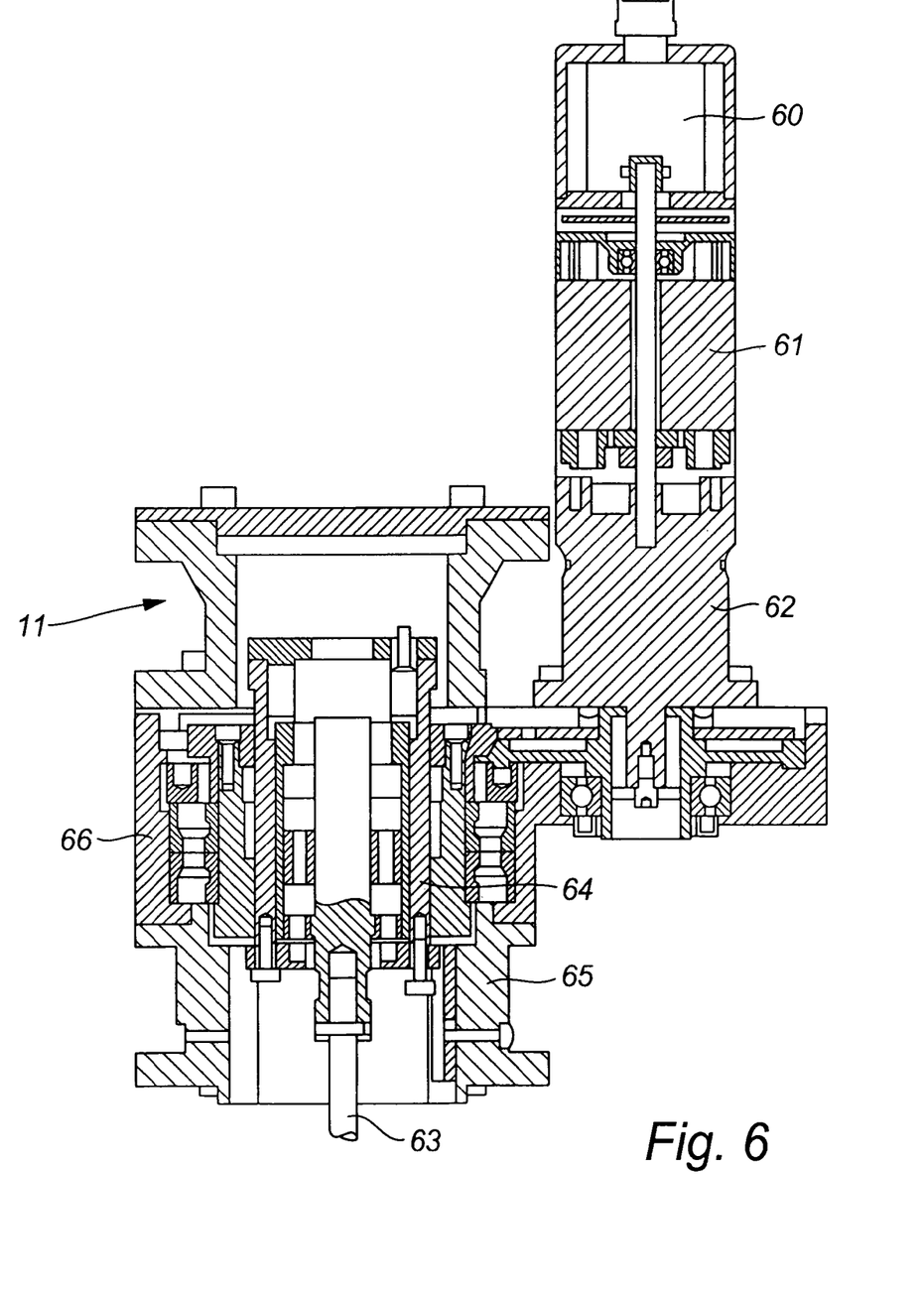
FIG. 6 a section of the feed unit.

The configuration of a feed unit, for example, for the machining unit 11 that can receive, move, and feed a honing tool as well as a fine boring tool is illustrated in FIG. 6. It has an incremental rotary position encoder 60 that determines the rotary angle of the direct current motor 61. The rotation is transmitted by a gear 62 and effects the axial movement of the ball bearing spindle 64 and the feed rod 63 connected thereto which causes in the tool the radial expansion of a honing stone (in case of a honing tool) or of a boring cutter (in case of a fine boring tool).

Figure 4B:
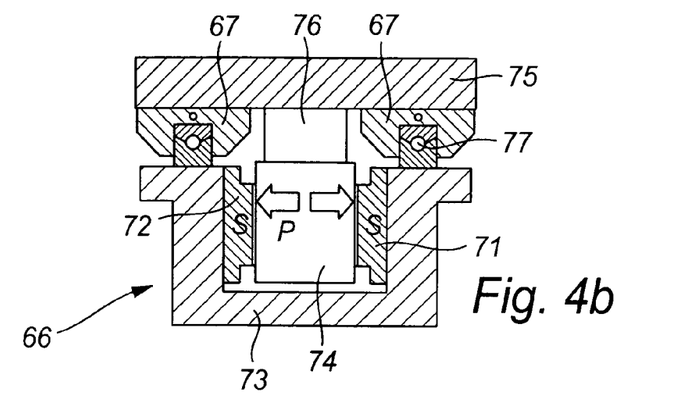
FIG. 4b a section of a linear motor that serves for moving a machining unit.
Figure 5:
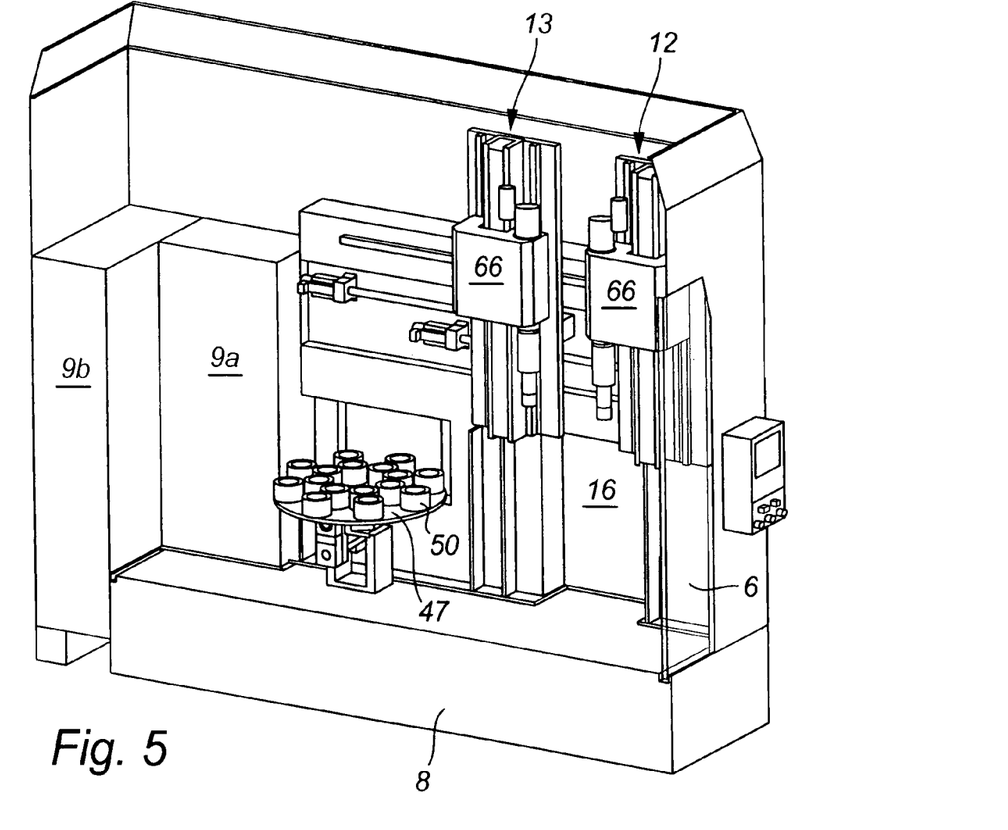
FIG. 5 the right half of the module 1 in perspective view (in accordance with FIG. 4)

The machining unit 10 (see FIG. 4) is formed by a plate 75 that is movable along the rails 40 and 41, namely by means of a spindle 42 which is driven in rotation by a motor 43. On the plate there are vertical rails 67, 68 (compare also FIG. 4b) on which a headstock 66 is guided by means of longitudinal guide 77. The headstock 66 contains the spindle 100 and the tool receptacle 80 is perpendicularly moveable along the rails 67, 68. The vertical drive can be, for example, an electric linear motor that is embodied so as to be free of transverse forces preferably in that on the inner side of the legs of the frame 73 the magnets 71 and 72 are arranged that form the secondary part (stator). The primary part (movable part) 74 is secured in this frame 73 and is secured on the headstock 66. The drive can be realized hydraulically but also as a threaded spindle drive. The arrangement of the spindles 100 of the two machining units 10, 11 is such that they are arranged on neighboring sides of the machining units and in this position adjacent to one another can machine also simultaneously neighboring bores of the workpiece 20. The distance is, for example, 150 mm.

In order to accomplish fine boring as wells as honing—prehoning as well as finish honing—the drives must be capable of providing the typical rotary speeds for honing of 250-350 rpm as well as the typical rotary speeds for fine boring of more than 1,000 rpm wherein for fine boring axial feed strokes of less than 1 m/min and for honing feed strokes of 20-60 m/min are to be provided.

Figure 7:
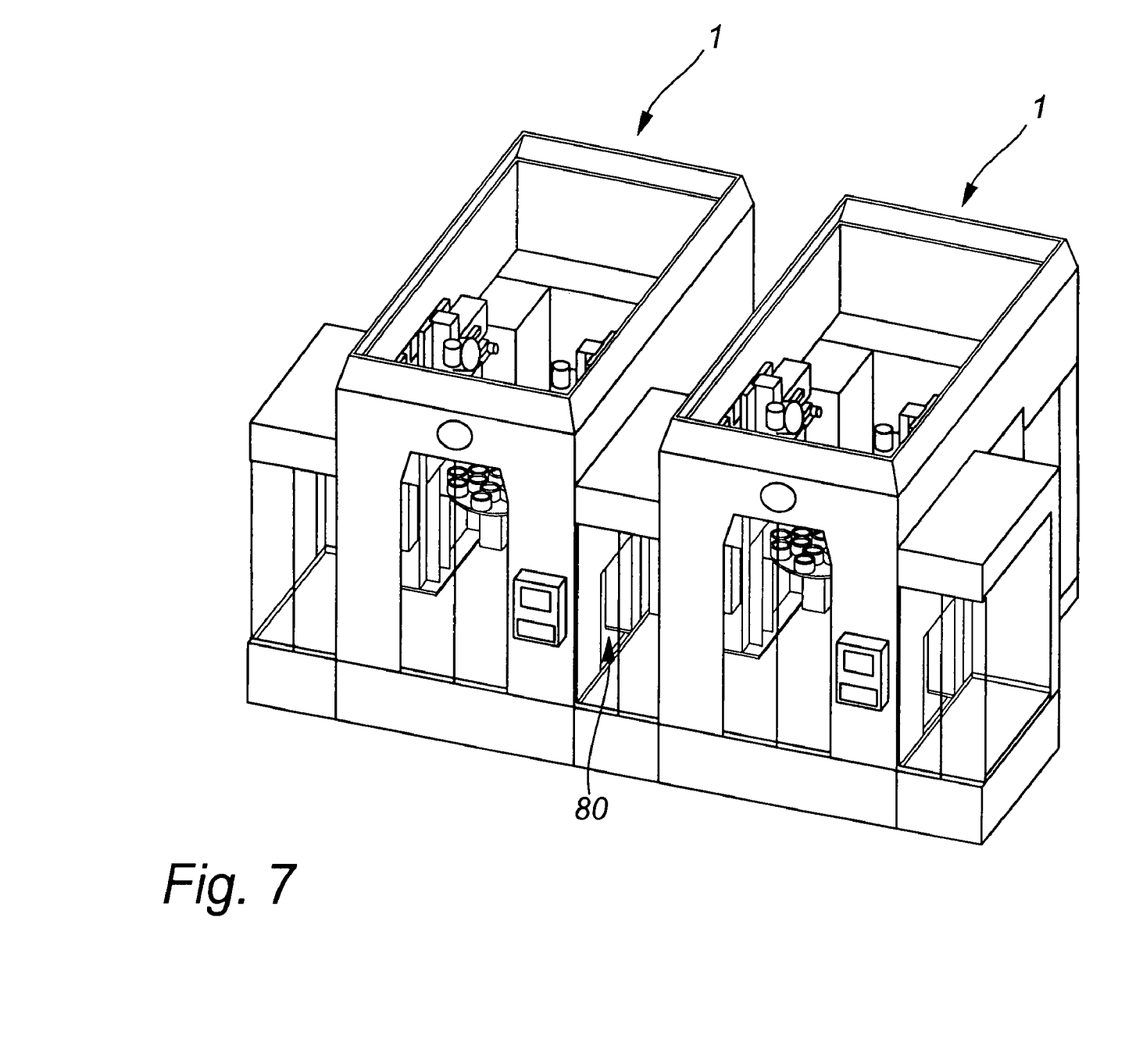
FIG. 7 two modules 1 that are linked with one another.

According to FIG. 7, several such modules 1 can be arranged adjacent to one another wherein between two modules 1 an empty module 80 can be used by means of which between the gates of the neighboring modules and an access to the workpieces and possibly further measures for control are possible.

Figure 8:
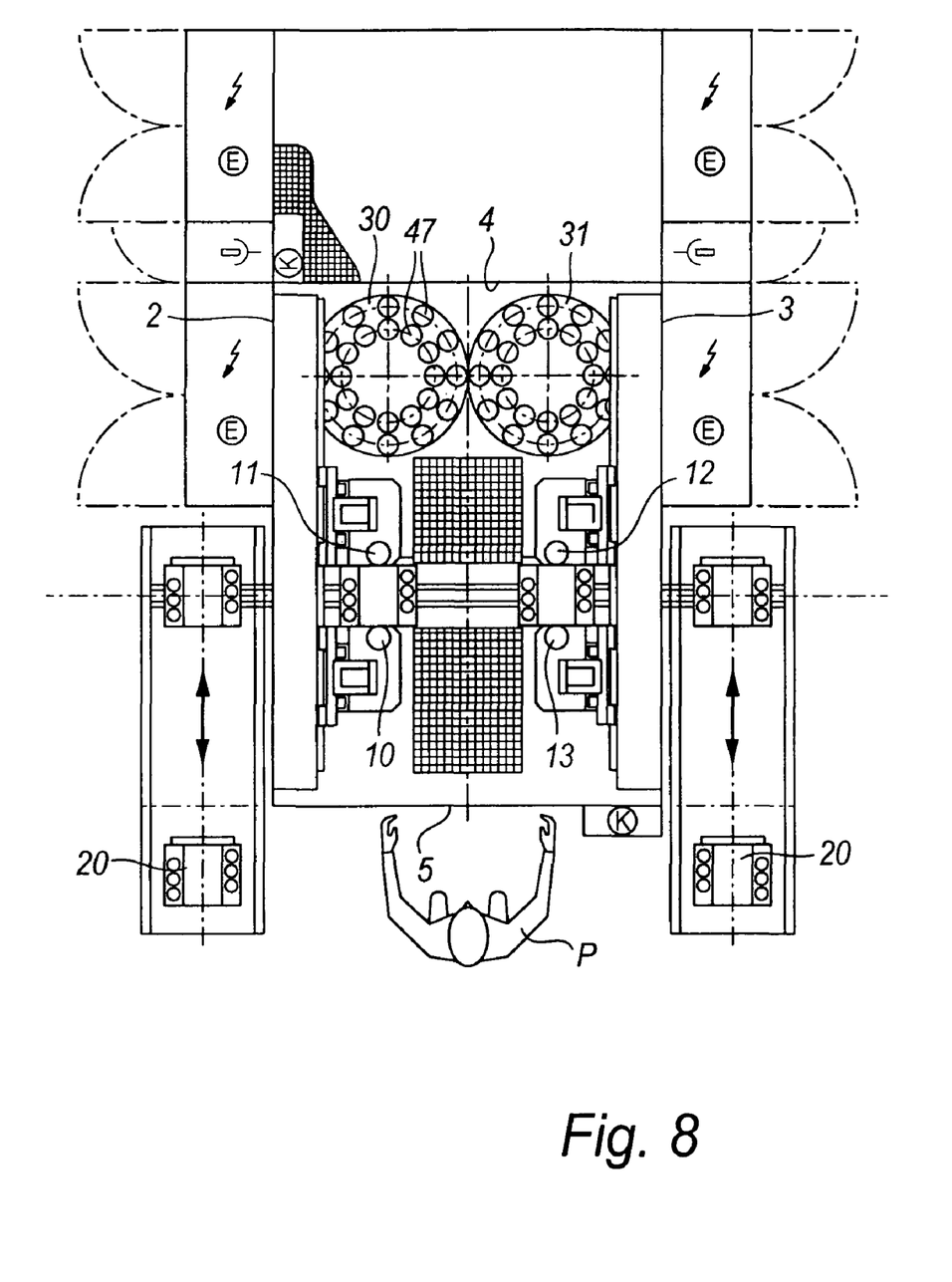
FIG. 8 the schematic illustration of a machining mode of a module designed for complete machining of a given workpiece (two of these workpieces are located in the module)

FIG. 8 shows schematically a module in which the workpieces 20 are supplied and removed separately from the left as well as from the right wherein the workpieces 20 supplied from the left are machined by the machining units 10 and 11, the workpieces supplied from the right machined by the machining units 12, 13. It is also possible to perform two machining steps of the machining units 10 and 11 and also of the machining units 12 and 13.

Figure 9:
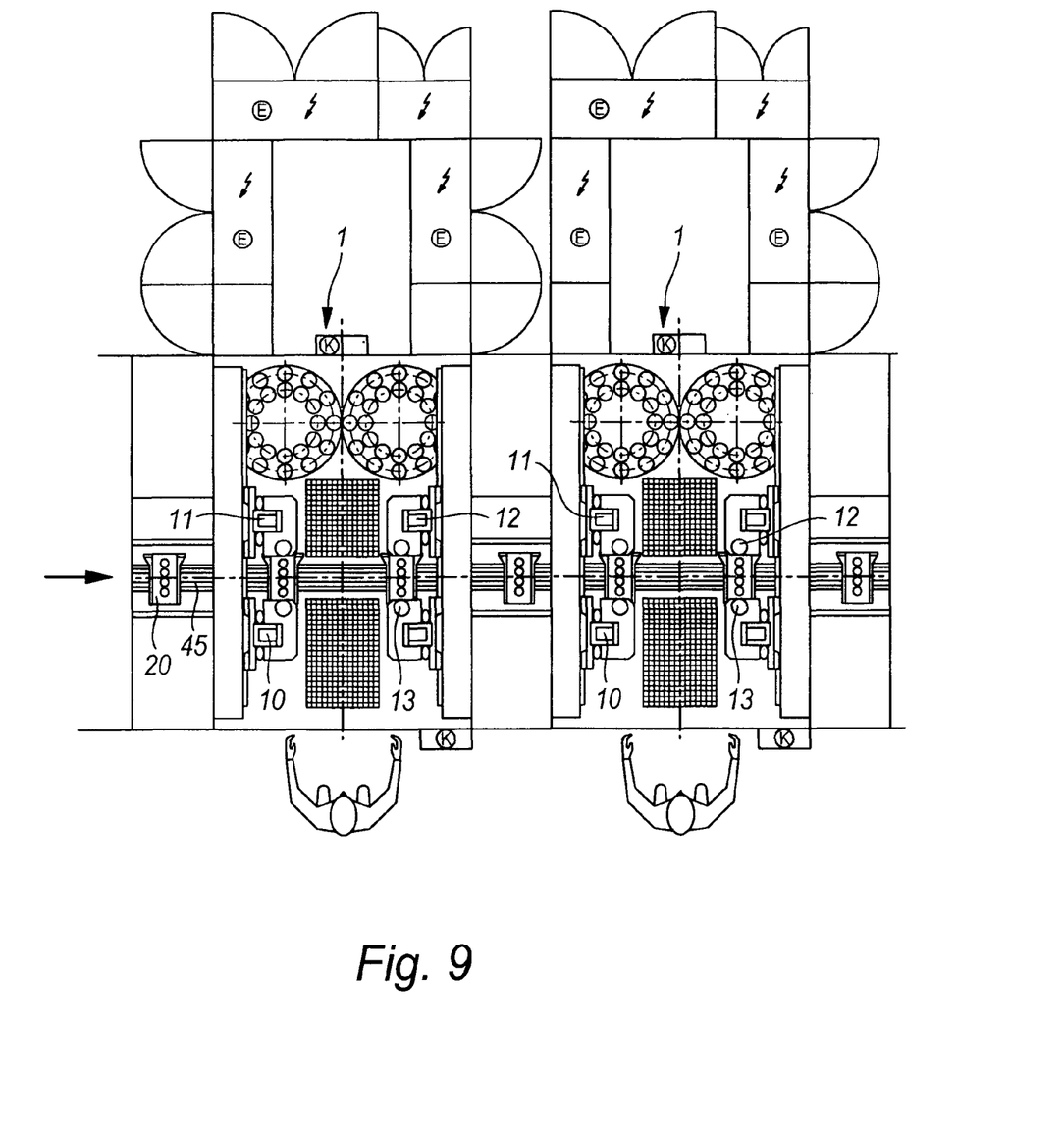
FIG. 9 a second machining mode designed for linked transfer operation.

FIG. 9 shows an embodiment in which the conveying rails for the supply and removal of workpieces 20 pass through the aligned gates 15, 16 of the two modules 1 that are linked in this way.

Figure 10:
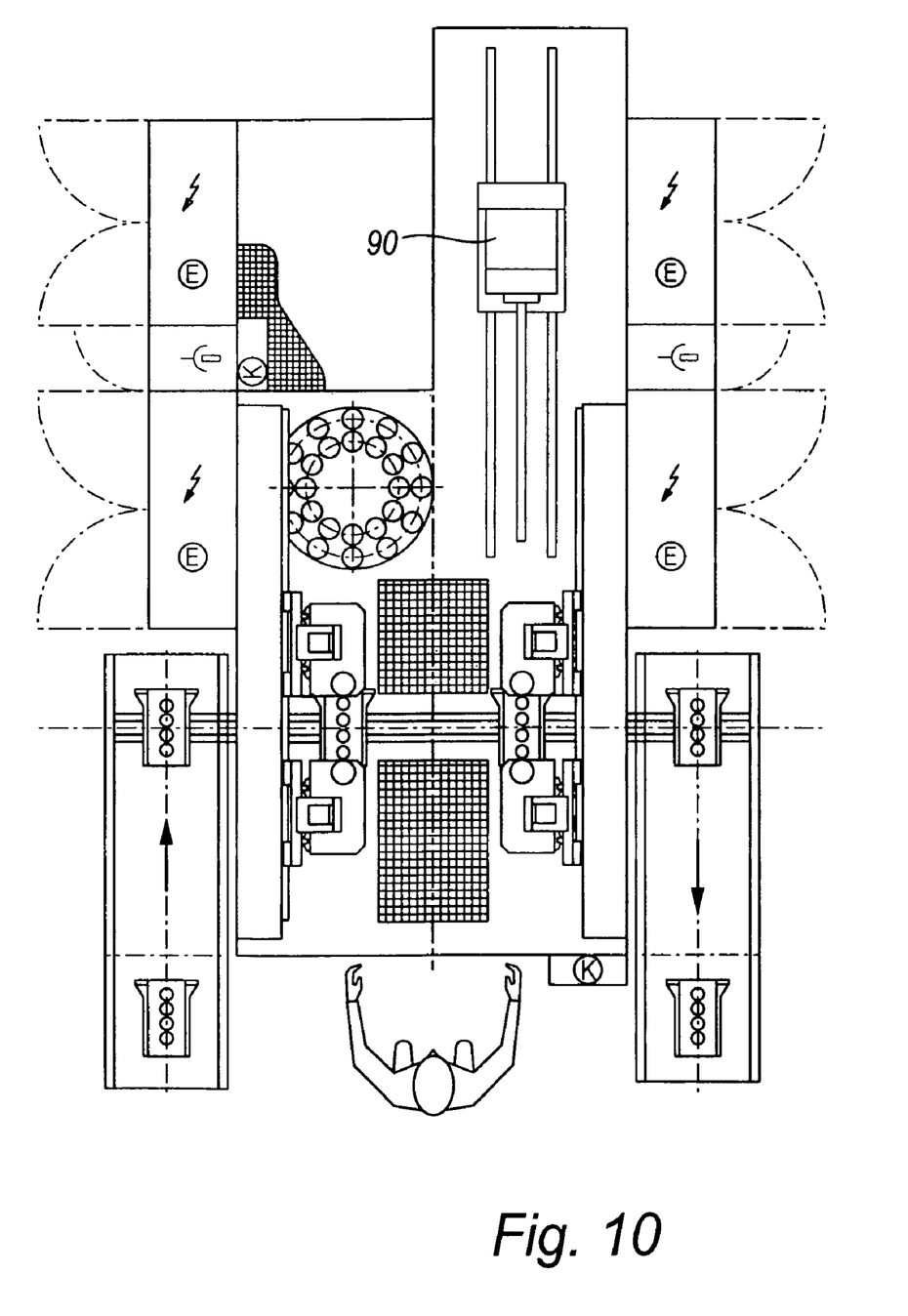
FIG. 10 a third machining mode designed for complete machining, for example, prehoning of a cylinder bore and simultaneous machining of the crankshaft bore.

FIG. 10 shows an embodiment in which a horizontal machining unit 90 is movable horizontally for machining the boring sections that are arranged to be vertically aligned with one another. The boring sections receive in case of a crankcase the bearings for the crankshaft.

What is claimed is:

1. A device for fine machining workpieces, the device comprising:
    a module with a substantially rectangular footprint and two oppositely positioned longitudinal sides and two opposed end walls connecting said two longitudinal sides;
    one or two horizontally movable machining units arranged on said two oppositely positioned longitudinal sides, respectively, within said module for honing and/or fine boring;
    wherein said machining units each comprise:
        an electromotorically driven spindle;
        an electromotoric or hydraulic drive that serves for generating an oscillating stroke movement of said spindle and for moving said machining unit into a working position;
        a tool receptacle with a rigid axis that is rigid relative to an axis of said spindle;
        a feed device for radial feeding of a machining tool received in said tool receptacle;
    a service chamber provided in said module between said two longitudinal sides, whereon a first one of said end walls has an entry into said service chamber;
    at least one tool magazine assigned to each one of said one or two machining units on said two longitudinal sides, respectively, and arranged within said module at a second one of said end walls;
    machining stations provided within said module on or in a vicinity of each one of said two longitudinal sides and accessible by said machining units arranged on said two longitudinal sides, respectively;
    wherein said two longitudinal sides each have a gate and workpieces are fed to said machining stations through said gates;
    wherein said gates are aligned with one another;
    wherein said machining stations each are accessible for machining of workpieces by said machining units arranged at a correlated one of said two longitudinal sides; and
    conveying rails for supply and removal of workpieces extending through said gates.

2. A method for fine machining workpieces in a device according to claim 1, comprising the steps of sequentially prehoning or fine boring; finish honing; and laser structuring or beveling the same workpiece in said module.

3. The method according to claim 2, wherein said same workpiece is a cylinder bore of a crankcase of an internal combustion engine.

4. A method for fine machining workpieces in a device according to claim 1, comprising the step of simultaneously processing two identical workpieces by prehoning or fine boring; finish honing; laser structuring of the surface or beveling.

5. The method according to claim 4, wherein said two identical workpieces are a cylinder bore of a crankcase of an internal combustion engine, respectively.

* * * * *